June 27, 1944.  F. M. SCHAEFER  2,352,292
SELF-BASTING PAN
Filed April 30, 1943   2 Sheets-Sheet 1
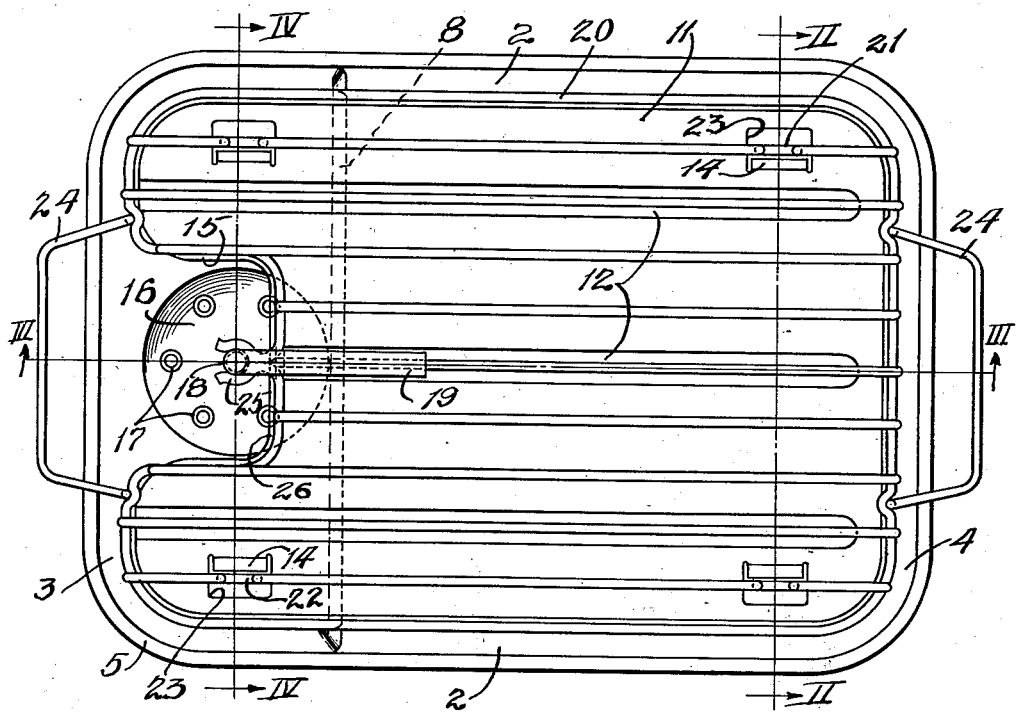
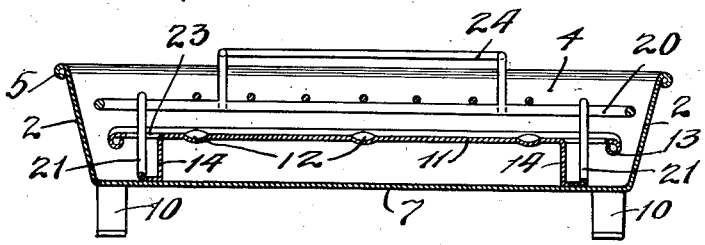
Inventor
Frank M. Schaefer
by Charles W. Hills, Attys.

June 27, 1944.  F. M. SCHAEFER  2,352,292
SELF-BASTING PAN
Filed April 30, 1943  2 Sheets-Sheet 2
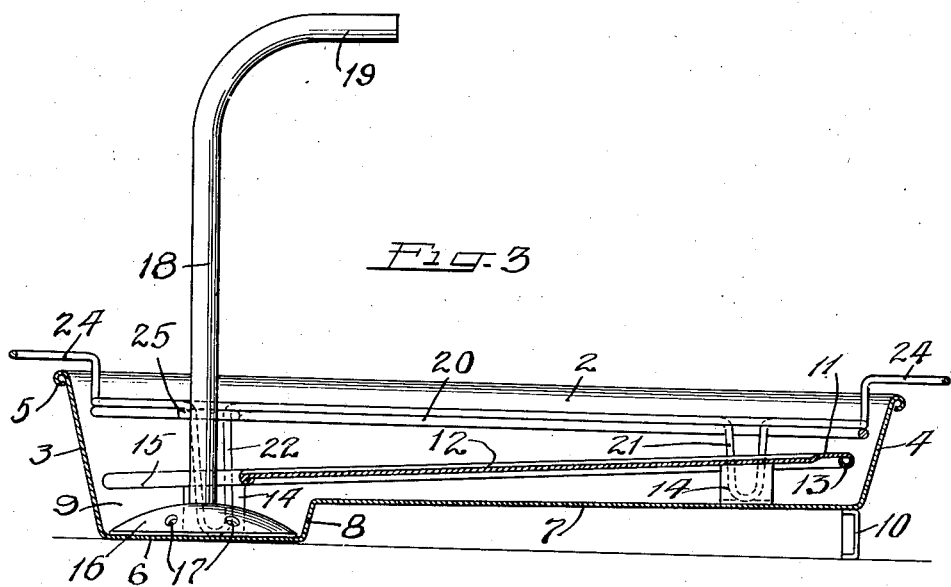
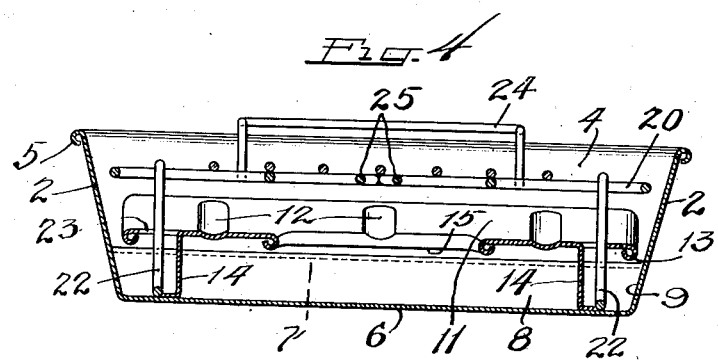
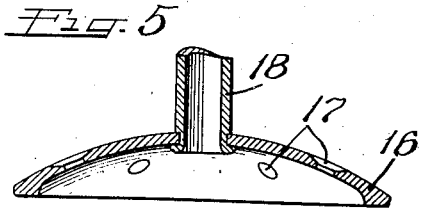
Inventor
FRANK M. SCHAEFER
by Charles W. Hills, Attys.

Patented June 27, 1944

2,352,292

UNITED STATES PATENT OFFICE 2,352,292

SELF-BASTING PAN

Frank M. Schaefer, Chicago, Ill., assignor of one-half to William G. Pankonin, Chicago, Ill.

Application April 30, 1943, Serial No. 485,128

5 Claims. (Cl. 99—346)

This invention relates to roasting pans and more particularly to a self-basting type of roasting pan wherein a minor section of the pan bottom only comes into direct contact with the floor of the oven, while the major portion of the main bottom of the pan is spaced above the oven floor. The pan has a removable auxiliary bottom or baffle plate and a removable meat supporting grid or rack therein for supporting meat to permit the same to be thoroughly basted by a basting unit removably seated in the deepest and hottest section of the pan for distributing gravy over the meat while it is subjected to a more or less substantially even distribution of the heat to all surfaces thereof for uniformly roasting the meat.

It is an object of this invention to provide a culinary appliance more particularly adapted for the roasting of meat and one in which the bottom is arranged with different levels whereby direct heat is thus applied to the lower level to heat a gravy well to supply a basting means with vaporized gravy for efficiently basting meat which is supported in the pan in position to permit heat to be circulated entirely around all surfaces of the meat.

It is also an object of this invention to provide a meat roaster which is designed and constructed with improvements for increasing the adaptability and efficiency thereof.

It is a further object of this invention to provide an improved roasting apparatus embodying a novel basting arrangement for meat supported to permit a free circulation of the heat around the meat for an even roasting of the same resulting from an improved construction of the interior of the pan.

It is furthermore an object of the invention to provide a roasting device with improved apparatus for supporting, basting and evenly roasting meat above a specially constructed pan bottom.

Another object of the herein described invention is to provide a roasting or baking apparatus embodying a novel basting or humidifying arrangement provided in a liquid well forming part of a multiple leveled bottom for the apparatus.

It is a feature of this invention to provide an improved type of roaster or baker wherein a novel bottom is provided for the pan whereby a liquid well forming a part of the bottom supports one end of the pan while the major portion of the bottom is elevated and supported above the bottom of a roasting or baking oven.

Another feature of the invention is to provide an improved and simplified form of culinary appliance in the form of a self-basting roaster having a gravy well and an elevated bottom and containing a meat supporting rack above an auxiliary baffle and drain panel for coaction with a novel baster whereby meat to be roasted is supported in a manner permitting the uniform circulation of heat entirely therearound to evenly roast the same.

Other objects and features of the invention will more fully appear from the following description taken in connection with the accompanying drawings which illustrate a preferred embodiment of the invention.

In the drawings:

Figure 1 is a top elevational view of an improved self-basting pan embodying the principles of this invention.

Figure 2 is a transverse sectional view taken on line II—II of Figure 1.

Figure 3 is a longitudinal sectional view taken on the line III—III of Figure 1, with parts shown in elevation.

Figure 4 is a transverse sectional view taken on line IV—IV of Figure 1.

Figure 5 is an enlarged diametrical vertical section of the bottom portion of the basting unit used in the pan.

As shown in the drawings:

The invention covers an improved type of culinary appliance and more particularly a self-basting type of roaster or a humidifying type of baking pan comprising a vessel or basin constructed of any selected or suitable type of material and preferably of a substantially rectangular, oval or other convenient and suitable shape.

In the showing of a preferred shape of vessel or basin, the same comprises longitudinal side walls 2 connected at their ends by end walls 3 and 4. The walls 2, 3 and 4 are inclined downwardly toward one another and have the upper marginal edges thereof rolled or curled to provide a finishing bead 5. By referring to Figure 3 it will be noted that the end wall 3 is deeper than the end wall 4. The bottom of the vessel is of novel construction and comprises a small bottom plate 6 and a large or major bottom plate 7. The bottom plates 6 and 7 are integrally connected to one another by a transverse wall 8 which as clearly shown in Figure 3 is also slightly inclined and together with the bottom plate 6 and the end wall 3 and portions of the side walls 2 forms a water or gravy well 9 transversely across the deepest end of the vessel so that when the pan or roaster is in use the bottom plate 6 is permitted to seat directly on the bottom of an oven while the major portion of the bottom formed by the bottom plate 7 is raised or elevated and is slightly inclined upwardly from the upper edge of the transverse wall 8 to the bottom edge of the end wall 4 to serve as a drain plate for the flow of gravy or other liquids from the plate 7 into the gravy well 9. For supporting the shallow end of the vessel, legs 10 are rigidly secured or formed at the two shallow corners of the pan beneath the end wall 4 to hold the pan or roaster level. It will thus be noted that the vessel or basin contains two sections the larger or major section being shallower than the deep section which includes the gravy well 9 and thereby provides an arrangement whereby the bottom plate 6 of the well is adapted to be brought into direct contact with the bottom surface of an oven while the bottom 7 is raised above the bottom of the oven and is consequently heated by the oven heat rather than by the direct heat from the oven bottom.

Removably mounted within the vessel or basin is a baffle or partition comprising a plate or board 11 constructed of metal or other suitable material and having formed therein a plurality of drain channels or troughs 12. The baffle plate of drain board 11 has the margin thereof curled or rolled to provide a finishing bead 13. The baffle plate 11 is supported by means of legs 14 which are stuck outwardly from the baffle plate 11 and extend downwardly to permit two of the legs to rest on the bottom plate 7 while the other two legs seat upon the bottom plate 6 within the well 9 thereby holding the drain or baffle plate 11 in an inclined position within the pan or roaster and affording an arrangement whereby gravy or other liquids deposited upon the baffle plate, drain downwardly into the gravy well 9. The lower end of the baffle plate 11 which projects over the well 9 has the middle portion thereof cut away to afford a central recess or notch 15.

For the purpose of providing an arrangement whereby meat which is being roasted is properly basted, an improved basting unit is removably seated in the pan or roaster and within the well 9 upon the well floor 6. The basting unit comprises a convex or dome-shaped base 16 which is open at the bottom while the arched wall forming the base is provided with a plurality of scattered or spaced apertures or openings 17 to permit gravy or water to enter through the openings 17 beneath the arched or dome-shaped base to become rapidly and thoroughly heated in the concentrated area beneath the base to cause evaporation of the gravy or liquid. The vaporized liquid or gravy is permitted to escape from the base 16 by means of an outlet or distributing tube 18 which projects upwardly above the upper edge of the pan or roaster and is deflected to provide a discharge arm 19 whereby the vaporized liquid or gravy percolating through the tube 18 and the arm 19 is discharged in a scattered condensed form over the top of the pan or roaster and is permitted to drop in a condensed form upon the contents of the pan.

For the purpose of supporting a meat roast, a fowl or the like within the pan or roaster for proper basting and for even roasting, the pan is provided with a removable wire grid or rack 20 formed with short wire legs 21 near one end thereof and with long wire legs 22 near the other end thereof to permit the grid to be placed within the vessel with the short wire legs 21 resting on the bottom plate 7 while the longer wire legs 22 are permitted to rest on the pan bottom 6 to hold the grid properly supported in a horizontal pisition within the vessel forming part of the roasting pan. In order to permit the grid legs 21 and 22 to seat on the bottom members of the pan the intermediate baffle plate or drain broad 11 is provided with openings 23 which may be individually provided in the plate 11 or which may be the result of forming the supporting legs 14 for the baffle plate 11 when the legs are stamped out of the material forming said plate. In order to removably place the grid or rack 20 within the roasting pan, handles 24 are provided on the ends of the grid or rack 20. One end of the wire rack 20 is formed to provide a bay or recess 26 by deflecting the wire forming the frame of the grid inwardly as illustrated in Figure 1 and permitting the ends of the wires to be then deflected outwardly to form a pair of spring type fingers or clips 25 between which the gravy percolating or distributing tube 18 of the basting unit is adapted to be removably engaged to hold the basting unit braced in position within the basting pan. The upper end of the tube 18 and the discharge arm 19 are positioned above the top of the roasting pan to permit a proper distribution of the condensed gravy being discharged from the mouth of the arm or nozzle 19 upon the meat which is supported in the pan upon the grid or rack 20 and above the plate or board 11. The plate 11 is positioned to catch gravy dripping from the meat and allow the gravy to flow down the drain plate back into the gravy well 9 to thereby provide an arrangement for continuously replenishing the supply of gravy in the well so that it can be repeatedly redistributed by the basting unit which causes the gravy to percolate upwardly through the tube 18 to be sprayed out of the nozzle or arm 19.

The operation of the improved self-basting pan or roaster is simple and efficient and affords a convenient arrangement for basting meat while it is being roasted without the use of the customary roasting pan cover. The novel arrangement of providing the vessel forming part of the roaster with a gravy well extending across the bottom at one end of the pan and with the major portion of the pan bottom elevated and slightly inclined toward the gravy well beneath the grooved drain plate or baffle, provides an efficient arrangement for permitting the gravy to drain back to the well into the field of operation of the basting unit to keep the well supplied with gravy for the proper basting of meat being roasted on the grid or rack. The meat is supported on the rack in position so that the same while being constantly basted is subjected to an even distribution of heat to all surfaces of the meat for uniformly roasting the meat.

It has been found that the improved device may be used as an efficient baking appliance for baking rolls, dumplings and the like, by using the basting unit as a humidifier by turning the discharge nozzle or arm 19 outwardly, instead of over the pan. When the device is used as a baking appliance, water is placed in the liquid well and is then permitted to be vaporized and discharged into the oven to humidify the air therein. The baking results obtained have been found to be extremely gratifying.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In an apparatus for roasting and basting meat which apparatus includes a container constructed with a bottom formed with a gravy well and with a raised bottom section, a drain baffle removably supported in the container and resting on the raised bottom section and in said well, a meat supporting rack placed in said container above the baffle and supported on the raised bottom section and in the well, and a basting unit removably supported in the well and projecting upwardly through the main baffle and through the rack.

2. In an apparatus for roasting and basting meat which apparatus includes a container constructed with a bottom formed with a gravy well and with a raised bottom section, a drain baffle removably supported in the container and resting on the raised bottom section and in said well, a meat supporting rack placed in said container above the baffle and supported on the raised bottom section and in the well, a basting unit removably supported in the well and projecting upwardly through the main baffle and through the rack, and gripping means on the rack for engaging the basting unit to hold the same braced in position.

3. In an apparatus for roasting and basting meat and which apparatus includes a container constructed with a bottom formed with a raised inclined bottom section and with a gravy well extending below the raised bottom section, a basting means supported in the well and projecting upwardly above the container, a drain baffle supported in the container with one end supported on the raised bottom section and the other end supported in the well, said baffle being notched to fit around the basting means, and a meat supporting rack removably engaged in the container above the drain baffle and gripping the basting means to hold the same braced in position.

4. A household appliance for roasting meat comprising a container formed with a gravy well at one end thereof and a raised bottom at the opposite end, a drain baffle removably engaged in the container with one end supported on the raised bottom with the opposite end supported in the well to hold the baffle in an inclined position, a meat supporting rack removably engaged in the container and having legs of different lengths to support one end of the rack on the raised bottom and the opposite end of the rack in the container well, handles on said rack, basting means in the container seated in said well and projecting upwardly above the container, and means on said rack for gripping the basting means to hold the same in place with the upper end of the basting means in position above the meat supported on the rack.

5. A culinary appliance comprising a pan consisting of a shallow major portion and a deep minor portion adjacent thereto and affording a gravy well in the pan, a gravy drain baffle supported in an inclined position within the pan and extending over the gravy well, a meat support in the pan above the drain baffle, an apertured dome-shaped member open at the bottom and seated in the gravy well, and a gravy distributing tube member on the dome-shaped member and projecting upwardly through the drain baffle and the meat support and above the top of the pan for exuding gravy over meat on the meat support to baste the same while being roasted.

FRANK M. SCHAEFER.